Nov. 19, 1940.                R. P. BENNETT                2,221,939
                          RADIO SIGNALING SYSTEM
                    Filed Nov. 3, 1937        2 Sheets-Sheet 1
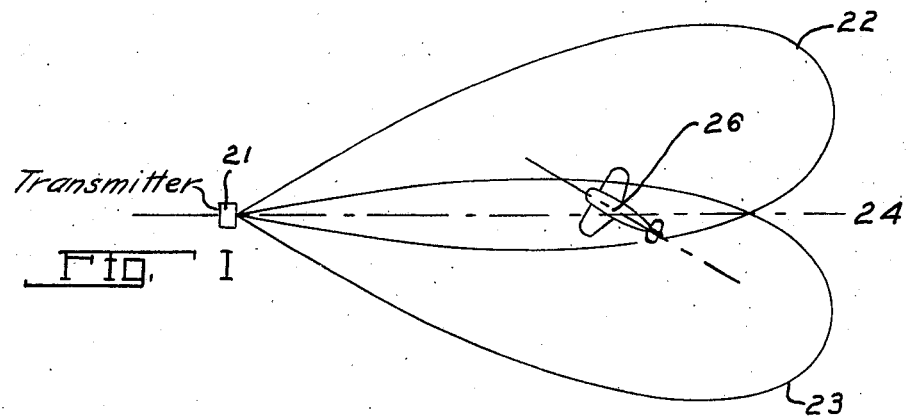
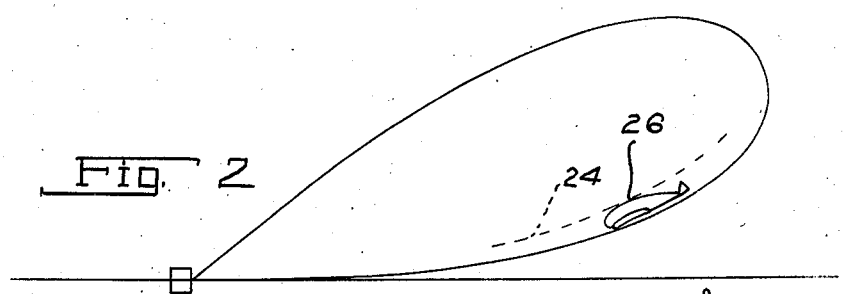
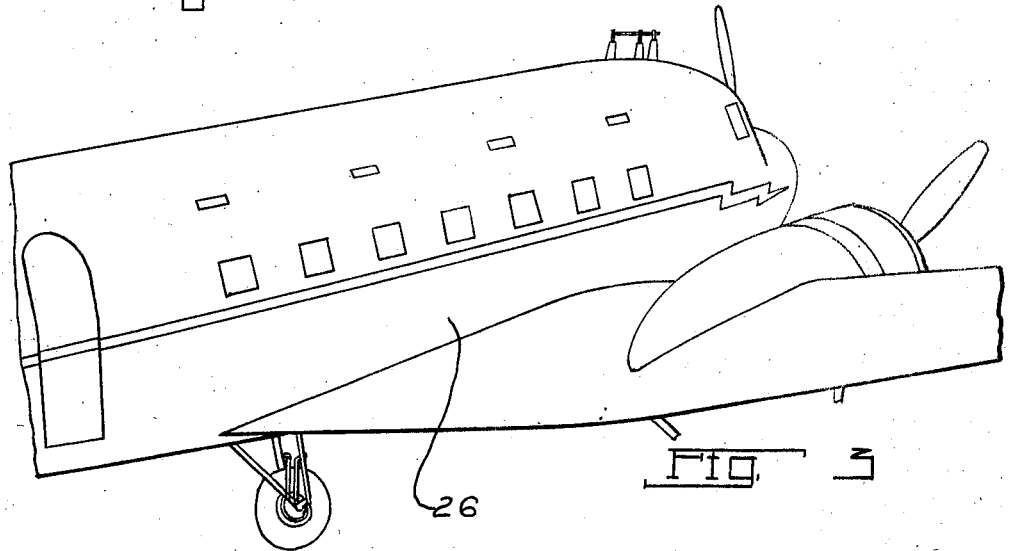
INVENTOR.
ROBERT P. BENNETT
BY McConkey Dawson & Booth
ATTORNEYS.

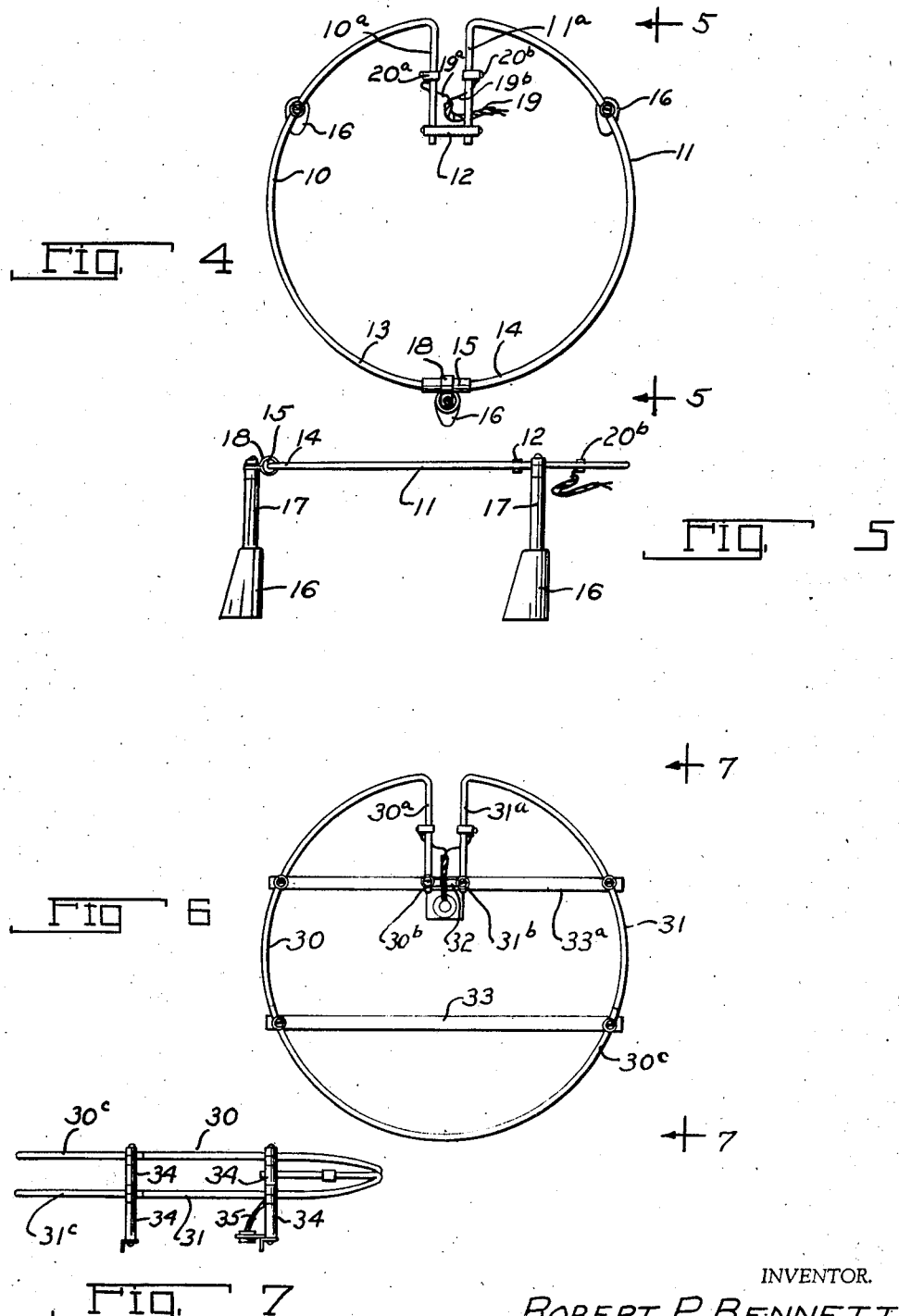

Patented Nov. 19, 1940

2,221,939

UNITED STATES PATENT OFFICE 2,221,939

RADIO SIGNALING SYSTEM

Robert P. Bennett, Chicago, Ill., assignor to Bendix Radio Corporation, Chicago, Ill., a corporation of Delaware Application November 3, 1937, Serial No. 172,529

3 Claims. (Cl. 250—11)

This invention relates to a radio signaling system and deals more specifically with an improved antenna which renders the system well adapted for the navigation of aircraft. The invention is particularly well adapted for the blind landing of airplanes, but may be used in other connections and for other purposes.

As is now well known in the art, airplanes may be landed in darkness or fog by the use of radio landing systems. Such systems commonly employ a ground transmitter for projecting a radio beam of some certain frequency. The radio receiver located in the airplane is tuned to this frequency, and according to the signals received through this receiver, the plane is guided down the radio beam to earth. In a landing system with which the improved antenna is particularly adapted for use, the ground transmitting station transmits a pair of overlapping horizontally polarized beams of ultra high frequency radio waves, the frequency of the waves being of the order of 70 or 100 megacycles.

In trials of all previously known types of antennas for use with the pilot's receiving apparatus, it has been found that the simple dipole or half-wave antenna horizontally mounted on the plane gave the best results. There are, however, certain disadvantages to the straight half-wave antenna when used for such purposes. While such an antenna has relatively great sensitivity, it does have definite directional characteristics and this constitutes a serious objection to such an antenna when used in navigation systems. The straight antenna is customarily mounted on the plane horizontally and disposed perpendicularly with the fore-aft axis of the plane. Due to the directional characteristics of this antenna, the maximum sensitivity occurs when the transmitting station lies along a line perpendicular with the center of the antenna, and when the plane is maneuvering near the landing field or when the plane is landing in a cross wind causing the plane to point in a direction other than the direction of flight toward the transmitting station, the sensitivity of such antenna is markedly reduced.

For example, when the plane is following the landing beam to earth in a cross wind so that the longitudinal axis of the plane is not alined with the transmitting station, the strength of the impulse picked up by the plane's receiving antenna is greatly reduced. Since the vertical position of the plane relative to the beam is given by the strength of the impulses received, this decrease in strength is interpreted by the pilot of the airplane as indicating that the plane is off course vertically—that the plane is too low. Intending to correct the vertical position with respect to the beam, the pilot then gains altitude, and before the error is discovered, the plane has climbed much too high and cannot descend on the beam.

With the correction of the above difficulties in mind, it is an important object of this invention to provide an antenna which when used as a part of the radio signaling system in aircraft, will be substantially equally sensitive to waves transmitted by a radio beacon regardless of the direction of the radio beacon or the angular position of the plane with respect to the beacon.

Here it may be stated that the vertically disposed half-wave antenna, which does have non-directional characteristics in a horizontal plane, is not applicable in the system just described because the radio energy generated by the transmitting station is horizontally polarized and the vertical antenna is not sensitive to such horizontally polarized waves.

Starting with the straight half-wave antenna previously considered best for this particular purpose, I find that I can obviate the above-discussed difficulties by bending back the ends of such an antenna toward each other, and from this concept I have developed the improved forms of the invention herein described.

Illustrative embodiments of the invention are shown in the accompanying drawings in which:

Figure 1 is a plan view showing in a diagrammatic way the space pattern of the radio beams emitted by the ground station transmitting means, this view showing also an airplane following the beams to earth while in a state of drift;

Figure 2 is a view similar to Figure 1, but taken in side elevation;

Figure 3 is a broken prospective view of an airplane equipped with the improved antenna;

Figure 4 is a plan view of a preferred form of the improved antenna;

Figure 5 is a view of the antenna shown in Figure 4 but taken in side elevation as indicated at line 5—5 of Figure 4;

Figure 6 is a plan view of a modified form of antenna; and

Figure 7 is a side view of the form shown in Figure 6, the view being taken as indicated at line 7—7 of Figure 6.

As illustrated in Figures 3 to 5 of the drawings, the improved antenna comprises a single conductor formed of two lengths of wire 10 and 11 which are connected together by the bridge 12. As more clearly shown in Figure 4, the end portions 10a and 11a may be turned rearwardly in parallel fashion and the bridge 12 adjustably secured so as to be movable along these end portions to vary the effective length of the conductor. It is understood, however, that conductors may be of only a single piece if so desired. As illustrated, the wires 10 and 11 are of uniform cross section and rod-like in character.

The two outer end portions 13 and 14 of the conductor are bent rearwardly and toward each other and are fixedly secured in the two ends of insulator 15. To thus secure the ends of the conductor at the insulator, the wire ends may be threaded and screwed into tapped holes in the insulator 15. Preferably the length of the conductor is approximately one half the length of the radio waves desired to be received. For example, when the antenna is used to receive on a frequency of 90 megacycles, the effective length of the conductor from one end to the other should be approximately 65 inches. As a practical matter, the actual length of the conductor when resonant to a given wave length may be slightly less than the calculated one half wave length due to the capacity effect between the ends.

The wires 10 and 11 and the bridge 12 may be made of copper or other material suitable for conducting electricity and the insulator 15 may be of any dielectric material.

For mounting the antenna on the airplane, I provide the three shoes 16 which are attached in any suitable way to the plane in a position such as shown in Figure 3 of the drawings. Insulator posts 17 are attached to shoes 16 and the tops of posts 17 are secured to the antenna in any suitable way. For convenience the rear post 17 may be secured to the insulator 15 by means of a strip 18 extending about the insulator and fastened to the post. It is understood that other methods of mounting the antenna on a plane may be used as may be desired.

The transmission line 19, preferably comprising a twisted pair, has its one side 19a connected by clamp 20a to end portion 10a and has its other side 19b connected by clamp 20b to end portion 11a. Clamps 20a and 20b are adjustable along end portions 10a and 11a so as to enable balancing impedances with the receiving set to which line 19 is connected.

In operation this improved antenna is non-directional in its own plane; that is, when mounted in horizontal position it will be equally sensitive to waves approaching from front, rear, right or left. I have found that the directivity pattern of the improved antenna approximates a true circle concentric with the antenna, and the non-directional characteristics of the antenna, are definitely established. I have found also that the sensitivity of the half-wave antenna has not been greatly impaired due to the change from the straight form to the curved or loop form and that the sensitivity of the improved half-wave antenna to waves in its own plane is comparable to the sensitivity of the ordinary half-wave antenna to waves in this same plane. Thus the advantages of the straight dipole or half-wave antenna have been retained while at the same time obtaining non-directional reception which is very important in the navigation systems above referred to.

In the blind landing systems for which the improved antenna is of particular advantage, a pair of horizontally polarized ultra high frequency radio beams is projected as from a ground transmitter 21 (see Figure 1 of the drawings). One beam is schematically illustrated by the loop 22 and the other by loop 23. In landing, the airplane is intended to follow the path 24 which represents equal intensity of the two beams and which is curved in vertical outline as shown by Figure 2 of the drawings. The vertical position of the plane relative to path 24 is determined by the field intensity of the ultra high frequency waves.

It will be observed that when the airplane 26 equipped with the improved antenna is landing at an angle as indicated in Figure 1, due to a side wind or other reason, the strength of signal produced by the aircraft receiver will be the same as if the longitudinal axis of the airplane were alined with the ground transmitting station. Thus the error above mentioned which has heretofore caused the pilot to believe that the airplane was too low, is eliminated.

A second form of antenna is illustrated in Figures 6 and 7 of the drawings. This construction involves a single conductor comprising a pair of wires 30 and 31 in vertically-spaced planes, having their inner end portions 30a and 31a arranged in an intermediate plane and turned rearwardly and secured to the tops of the screws 30b and 31b. A bridge 32 is adjustably secured on these screws so as to be movable therealong to vary the effective length of the conductor. The outer portions of wires 30 and 31 are bent rearwardly and the end portions 30c and 31c are placed in overlapping relation and spaced apart. The conductor may be supported upon means such as frame bars 33 and 33a by the use of insulating pieces 34 which are effective in spacing the rear end portions vertically apart and for insulating the wires from the frame. The antenna may be mounted on an airplane in any suitable manner. The transmission line 35 may be connected to end portions 30a and 31a in the same manner as set forth in connection with the first described form of antenna.

By thus overlapping the end portions of the antenna conductor, the length of the conductor, and therefore the size of the antenna, may be reduced while still keeping the conductor resonant to the particular wave length. This form of antenna, while not as sensitive as the form first described, may be used when the antenna is to be located in a small space, for example.

The operation of this modified form of antenna seems to resemble the operation of a straight dipole antenna which is shortened in length and end loaded, the capacity effected by the overlapped ends being similar to the loading on the ends of the straight antenna; on the other hand, this form of the improved antenna, as well as the form first described, is non-directional and equally sensitive to waves approaching from all directions in its plane. The size of the antenna may be increased or decreased as may be desired while still retaining resonant operations by changing the degree to which the end portions overlap.

In both forms of the antenna herein described the conductors are turned into arcuate outline to form the loop, and the antennas are generally circular in shape. While such curvature of the conductors is preferred, it is deemed within the scope of the invention to have the outer ends of the conductors turned rearwardly in any suitable fashion; for example, the conductors may be formed so as to give the antenna an elliptical shape.

While in the above explanation, the improved antenna yields special advantages as a part of the radio receiving apparatus, the new antenna may also be used as a part of the transmitting apparatus. When this antenna is used for transmitting, its characteristics are substantially the same as in receiving, the radio energy being horizontally polarized and transmitted substantially equally in all directions in the plane of the antenna. If desired, the improved type antenna may be incorporated both in the transmitting and receiving apparatus.

With the user of higher frequencies, the polarization of the radio waves becomes increasingly important since above about 30 megacycles there is little reflection from the Kennely-Heaviside layer. Thus the importance in a high frequency signaling system of an antenna which transmits radio waves in an efficient manner equally in all directions in the plane of polarization, is easily realized. Also the importance of being able to receive such polarized waves with equal sensitivity from all directions in the plane of polarization is clearly seen.

It should be understood that while the signaling system involving the improved antenna structure is peculiarly adapted for the navigation of aircraft, such signaling system may also be applied to great advantage in other situations. For example, in police radio systems the ability to transmit and receive horizontally polarized waves equally in all directions in the horizontal plane, is deemed of great importance. In applying the new system to either aircraft or police communication, an added advantage is gained in that the antenna need not be mounted precariously in extended vertical position to obtain non-directional transmission or reception as would be the case with a vertical antenna.

The foregoing detailed description has been given for clearness of understanding only and no unnecessary limitations should be understood therefrom, but the appended claims should be construed as broadly as permissible in view of the prior art.

I claim:

1. In a blind landing system for aircraft, a ground transmitter projecting horizontally polarized radiation in a predetermined landing zone, an aircraft having a dipole antenna horizontally mounted thereon, said dipole being bent to bring the ends thereof into relative proximity, and means for securing said dipole to produce a predetermined capacitive relation between the said ends.

2. In a blind landing system for aircraft, a ground transmitter projecting horizontally polarized radiation in a predetermined landing zone, an aircraft having a dipole antenna horizontally mounted thereon, said dipole being bent to bring the ends thereof into substantially abutting position, and means for securing said dipole to produce a predetermined capacitive relation between the said ends.

3. In a blind landing system for aircraft, a ground transmitter projecting horizontally polarized radiation in a predetermined landing zone, an aircraft having a dipole antenna transversely mounted thereon, said dipole having the ends thereof bent rearwardly, and means for securing the said dipole ends in spaced relation.

ROBERT P. BENNETT.